United States Patent
Ahmed

(10) Patent No.: US 8,224,330 B2
(45) Date of Patent: Jul. 17, 2012

(54) METHOD AND SYSTEM FOR INTERWORKING BETWEEN TWO DIFFERENT NETWORKS

(75) Inventor: Hanan Ahmed, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 409 days.

(21) Appl. No.: 12/533,481

(22) Filed: Jul. 31, 2009

(65) Prior Publication Data

US 2010/0035578 A1    Feb. 11, 2010

Related U.S. Application Data

(60) Provisional application No. 61/087,079, filed on Aug. 7, 2008.

(51) Int. Cl.
*H04W 36/00* (2009.01)
(52) U.S. Cl. ........ 455/436; 455/411; 455/437; 455/438; 455/439; 455/440; 455/441; 455/442; 455/443; 455/444; 455/445
(58) Field of Classification Search .................. 455/411, 455/436–445, 432.1, 432.2, 432.3, 433, 434
See application file for complete search history.

(56) References Cited

U.S. PATENT DOCUMENTS

| | | | |
|---|---|---|---|
| 2005/0078824 A1* | 4/2005 | Malinen et al. | 380/247 |
| 2010/0303238 A1* | 12/2010 | Cakulev et al. | 380/272 |

FOREIGN PATENT DOCUMENTS

EP    2031926 A1 *    3/2009

OTHER PUBLICATIONS

Chen, B., "Messaging: Interworking Deployment scenario," WiMAX Forum Service Provider Working Group, Jul. 14, 2009, 5 pages.
Eklund, C., et al., "IEEE Standard 802.16: A Technical Overview of the WirelessMAN™ Air Interface for Broadband Wireless Access," Jun. 2002, submitted by Roger Marks, IEEE C802.16-02/05, 12 pages.
"802.16 IEEE Standard for Local and Metropolitan area networks; Part 16: Air Interface for Fixed Broadband Wireless Access Systems," IEEE Std 802.16™-2004, Oct. 1, 2004, 894 pages.

(Continued)

*Primary Examiner* — Kamran Afshar
*Assistant Examiner* — Shahriar Behnamian
(74) *Attorney, Agent, or Firm* — Slater & Matsil, L.L.P.

(57) ABSTRACT

Systems and methods for interworking between two different networks are presented. In one embodiment, a method for wireless communication includes requesting a network access from an access point of a first network, and transmitting an EAP authentication request from the access point to a user end. An EAP authentication request response is sent from the user end to the access point. The EAP authentication request response includes an attach type indicator that indicates to a gateway associated with the access point whether the attach request is an initial attachment or a handover from a second network.

22 Claims, 7 Drawing Sheets

OTHER PUBLICATIONS

"IEEE Standard for Local and metropolitan area networks; Part 16: Air Interface for Fixed and Mobile Broadband Wireless Access Systems; Amendment 2: Physical and Medium Access Control Layers for Combined Fixed and Mobile Operation in Licensed Bands *and* Corrigendum 1," IEEE Std. 802.16e™-2005 *and* IEEE Std. 802.16™-2004/Cor1-2005 (Amendment and Corrigendum to Std. 802.16-2004), Feb. 28, 2006, 864 pages.

WiMAX Forum, "Mobile WiMAX Security White Paper," Airspan Networks Inc., 2007, 20 pages.

Premec, D., et al., "APN and Attach-Type Indication for WiMAX-EPC interworking," WiMAX Forum, 2007, 9 pages.

Singh, S., et al., "Use Cases for the Security SG Technical Requirement," IEEE 802.21 MIHO, Security Study Group Discussion, Nov. 5, 2007, 15 pages.

"IEEE Standard for Local and metropolitan area networks; Part 16: Air Interface for Fixed and Mobile Broadband Wireless Access Systems; Amendment 3: Management Plane Procedures and Services," IEEE Std. 802.16g™-2007 (Amendment to IEEE Std 802.16™-2004), Dec. 31, 2007, 202 pages.

ETSI TS 123 402 V8.6.0 (Jun. 2009), "Universal Mobile Telecommunications System (UMTS); LTE; Architecture enhancements for non-3GPP Accesses (3GPP TS 23.402 version 8.6.0 Release 8)," Jun. 2009, 199 pages.

Kroeselberg, D., et al., Mobile WiMAX Network Security: Overview and Selected Aspects, Nokia Siemens Networks, MobiSec 2009, Jun. 3-5, 2009, Turin Italy, 18 pages.

Intel, "3GPP EPC Attach over WiMAX ASN," Sep. 19, 2008, 4 pages.

* cited by examiner

METHOD AND SYSTEM FOR INTERWORKING BETWEEN TWO DIFFERENT NETWORKS

This application claims the benefit of U.S. Provisional Application No. 61/087,079, filed on Aug. 7, 2008, entitled "WiMax using EAP Procedure Priority", which application is hereby incorporated herein by reference in its entirety.

TECHNICAL FIELD

The present invention relates generally to wireless communication, and more particularly to interworking between two different networks.

BACKGROUND

A cellular telecommunications system is a communications system that is based on the use of radio access entities and/or wireless service areas. The access entities operate over respective coverage areas that are typically referred to as cells. In a cellular system, a base transceiver station provides a wireless communication facility that serves mobile stations (MS) or similar wireless user equipment (UE) via an air or radio interface within the coverage area of the cell. Examples of cellular telecommunications systems include standards such as GSM (Global System for Mobile communications) or various GSM based systems (such as GPRS (General Packet Radio Service)), AMPS (American Mobile Phone System), DAMPS (Digital AMPS), WCDMA (Wideband Code Division Multiple Access), UMTS (Universal Mobile Telecommunications System), CDMA 2000, and so on.

UMTS is a so-called third generation system expected to replace GSM soon. The third generation partnership project (3GPP) has been setting out aspects of the UMTS system. The 3rd Generation Partnership Project (3GPP) is a collaboration between groups of telecommunications associations, to make a globally applicable third generation (3G) mobile phone system specification within the scope of the International Mobile Telecommunications-2000 project of the International Telecommunication Union (ITU).

Worldwide Interoperability for Microwave Access or WiMAX is a different telecommunications technology aimed at providing wireless data over long distances in a variety of ways; from point-to-point links to full mobile cellular type access. WiMAX provides the delivery of last mile wireless broadband access as an alternative to cable and DSL. The WiMAX Forum has defined an architecture that defines how a WiMAX network connects with other networks, and a variety of other aspects of operating such a network, including address allocation, and authentication.

In a telecommunications network, a mobile station is typically connected to a local network, which provides, among other things, radio connectivity. The local network also establishes a connection between the mobile station and a network where a variety of services (e.g., routing, Internet protocol routing, etc.) are provided.

FIG. 1 is a simplified diagram illustrating a conventional telecommunications network. As an example, the conventional telecommunications network as illustrated in FIG. 1 complies with WiMAX wireless networks.

As shown in FIG. 1, the mobile station MS, which is sometimes referred to as mobile subscriber station SS when the mobile station MS is subscribed to a specific network service provider, is connected to an access service network. For example, the MS is connected to the access service network (ASN). For example, the ASN is configured to provide radio access to the mobile station. The ASN may include a base station (BS) for providing radio access. For example, the BS refers to generalized equipment set for providing connectivity, management, and control of mobile stations. In addition, the ASN includes a gateway (ASN GW) for interfacing with other networks. For example, the gateway allows the mobile station 101 to communicate with other ASNs (e.g., another ASN). As another example, the gateway allows the mobile station to connect to a connectivity service network (CSN), which may also include a Home Agent HA. As an example, the connectivity service network refers to a set of network functions that provide, among other things, IP connectivity service to mobile stations. Often, the CSNs also store policies associated with mobile stations, and includes an Authentication, Authorization and Accounting (AAA) Server. NAP is a Network Access Provider that includes the ASN.

Typically, a mobile station connects to a CSN that stores the network policies associated with the mobile station through an ASN. As an example, the CSN is often referred as a network service provider from a management perspective. Similarly, the ASN is often referred to as a network access provider from a management perspective. Typically, the ASN and/or the CSN stores information associated with individual wireless devices. As an example, the information includes location information of a specific wireless device. As another example, the information includes context information for a wireless device. NSP is a Network Service Provider that also includes the CSN.

A number of components (not all shown), plus some of the interconnections (or reference points) between these, labeled R1 to R5 and R8 are defined by the WiMAX forum.

Conventional wireless networks do not function seamlessly when a wireless device moves and/or enters into a geographical location serviced by a different type of wireless network or if a wireless device accesses multiple types of networks simultaneously.

Hence, what is needed are methods and systems to enable interworking between different networks (e.g., 3GPP and WiMax) without significant service interruption and impact performance of UE and/or network.

SUMMARY OF THE INVENTION

These and other problems are generally solved or circumvented, and technical advantages are generally achieved, by illustrative embodiments of the present invention.

Embodiments of the invention include mechanisms to enable interworking between different networks, for example, 3GPP and WiMax.

In accordance with an embodiment of the present invention, a method for wireless communication comprises requesting a network access from an access point of a first network, and transmitting an EAP authentication request from the access point to a user end. An EAP authentication request response is sent from the user end to the access point. The EAP authentication request response comprises an attach type indicator that indicates to a gateway associated with the access point whether the attach request is an initial attachment or a handover from a second network.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which:

FIG. 2, which includes

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

Figure 1:
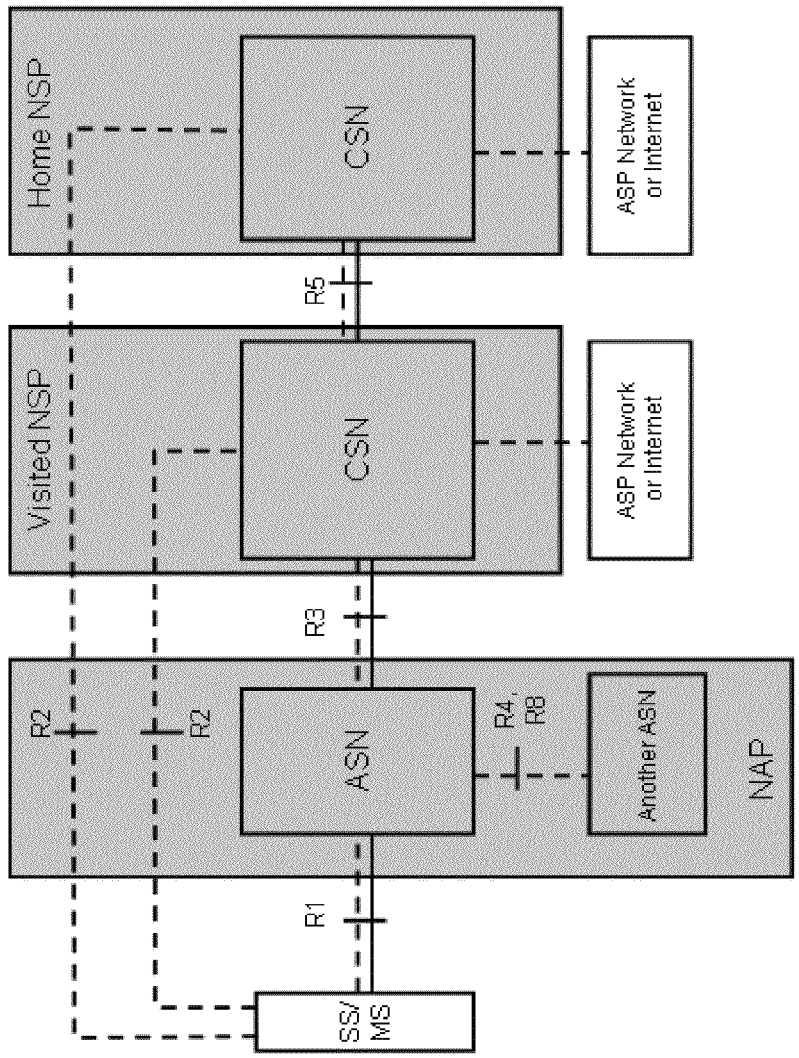
FIG. 1 is a prior art WiMax architecture.

The making and using of various embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to various embodiments in a specific context, namely interworking between WiMax and 3GPP networks. The invention may also be applied, however, to other types of networks. Embodiments include systems and methods for interoperability between WiMax and 3GPP systems.

When a wireless device moves and/or enters into a geographical location, the wireless device performs a network detection and selection process to obtain wireless connectivity. For example, the new location may only be serviced by a different type of network, e.g., a device may then subsequently move from a location serviced by 3GPP to a location serviced only by WiMax or from a WiMax network to a 3GPP network. In such situations, during the handover process, it is necessary to maintain the network connection so that the end user seamlessly transitions from the first type of network to a different second type of network. Similarly, some locations may be serviced by two different types of networks such as both 3GPP and WiMax. In such scenarios it is necessary to distinguish between requests for new network connections and handovers.

3GPP requires that the mobility management procedures specified to handle mobility between 3GPP Accesses and WiMAX must include mechanisms to minimize the service interruption during handover and where possible, support bidirectional service continuity. The mobility management procedures should also minimize any performance impacts to the UE and the respective accesses; for example, UE battery consumption and network throughput. The mobility management procedures should minimize the coupling between the different accesses allowing independent protocol evolution in each access. Furthermore, the mobility management procedures specified to handle mobility between 3GPP accesses and WiMAX should minimize the impact on legacy systems (i.e., UTRAN and GERAN).

Embodiments of the invention overcome these and other limitations and enable interworking between different types of networks (e.g., 3GPP and WiMax) without significant service interruption and impact performance of UE and/or network.

For the purposes of the present document, the following abbreviations apply.
APN: Access Point Node
AMBR: Aggregate Maximum Bit Rate
CCoA: Collocated Care-of-Address
EPC: Evolved Packet Core
EPS: Evolved Packet System
E-UTRAN: Evolved UMTS Terrestrial Radio Access Network
FACoA: Foreign Agent Care-of-Address
FQDN: Fully-Qualified Domain Name
GW: Gateway
HPLMN: Home Public Land Mobile Network
HRPD: High Rate Packet Data
HS-GW: HRPD Serving Gateway
HSS: Home Subscriber Server
IP-CAN: IP-Connectivity Access Network
IPMS: IP Mobility Management Selection
LMA: Local Mobility Anchor
MAG: Mobile Access Gateway
MIPv4: Mobile IP version 4
MIPv6: Mobile IP version 6
MME: Mobility Management Entity
P-GW: PDN Gateway
PCRF: Policy and Charging Enforcement Function
PMIP/PMIPv6: Proxy Mobile IP version 6
PLMN: Public Land Mobile Network
SectorID: Sector Address Identifier
S-GW: Serving Gateway
VPLMN: Visited Public Land Mobile Network Various non-roaming and roaming architectures within EPS and WiMax will be described with respect to FIG. 2. An embodiment of the invention enables interworking between 3GPP and WiMax networks will be first described using FIG. 3. Further embodiments are described using FIGS. 4 and 5 wherein a WiMax network is used to connect to a UE handed over from a 3GPP network.

Figure 2A:
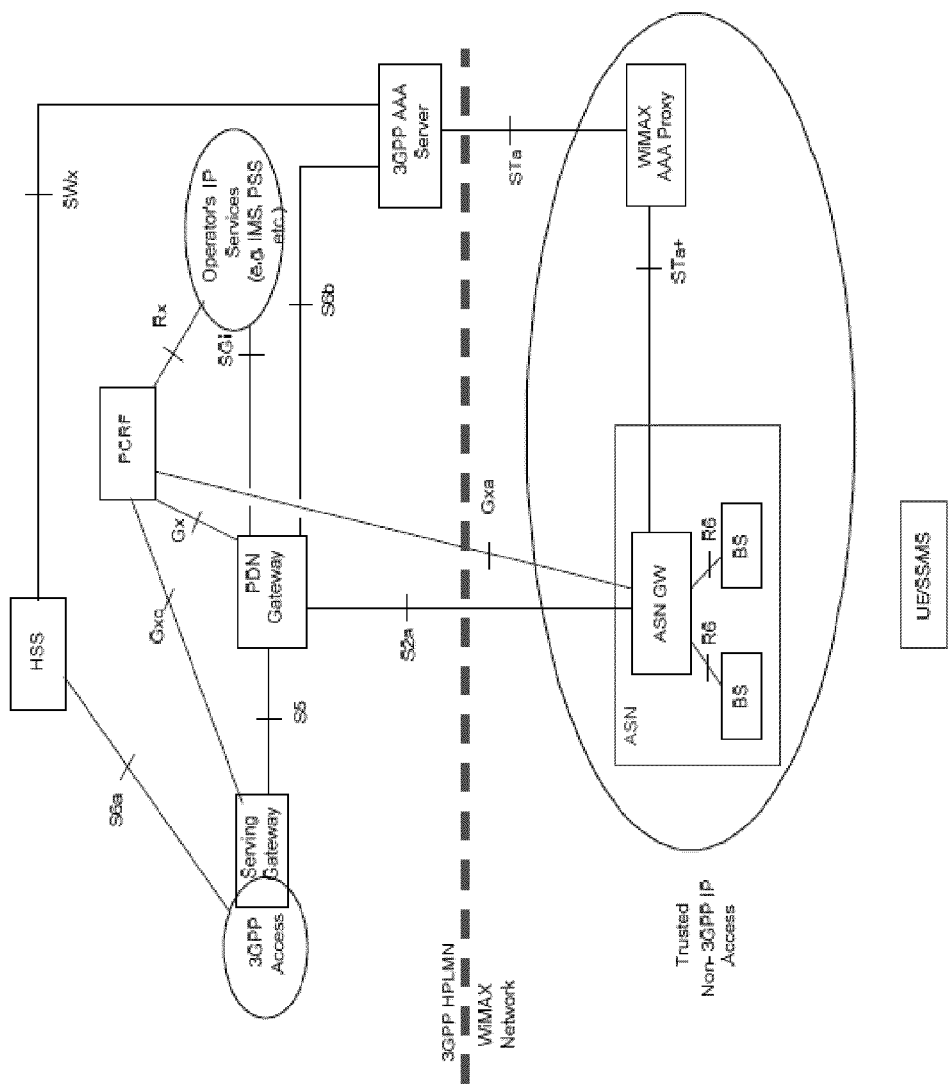
FIGS. 2a-2c, illustrates non-roaming and roaming architectures within EPS and WiMax.
Figure 2B:
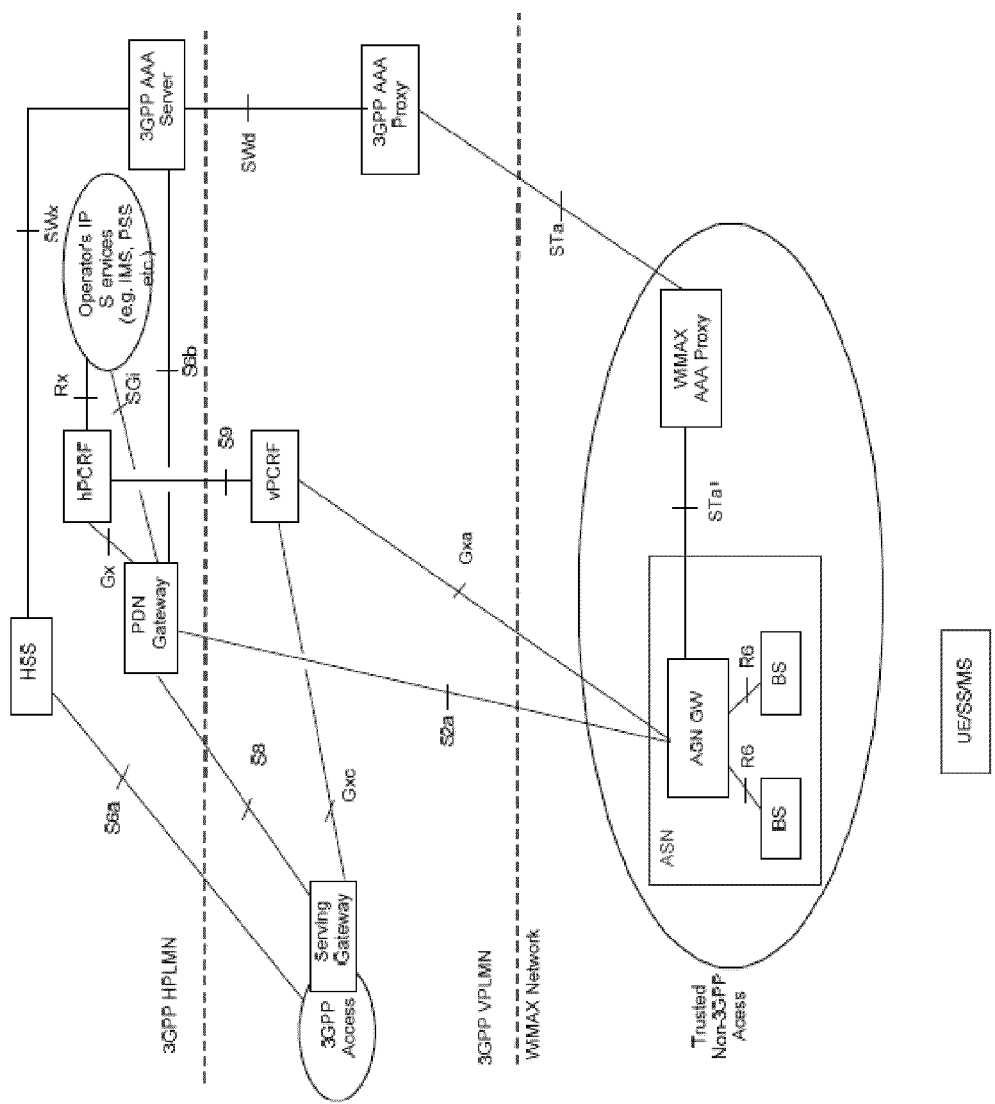
Figure 2C:
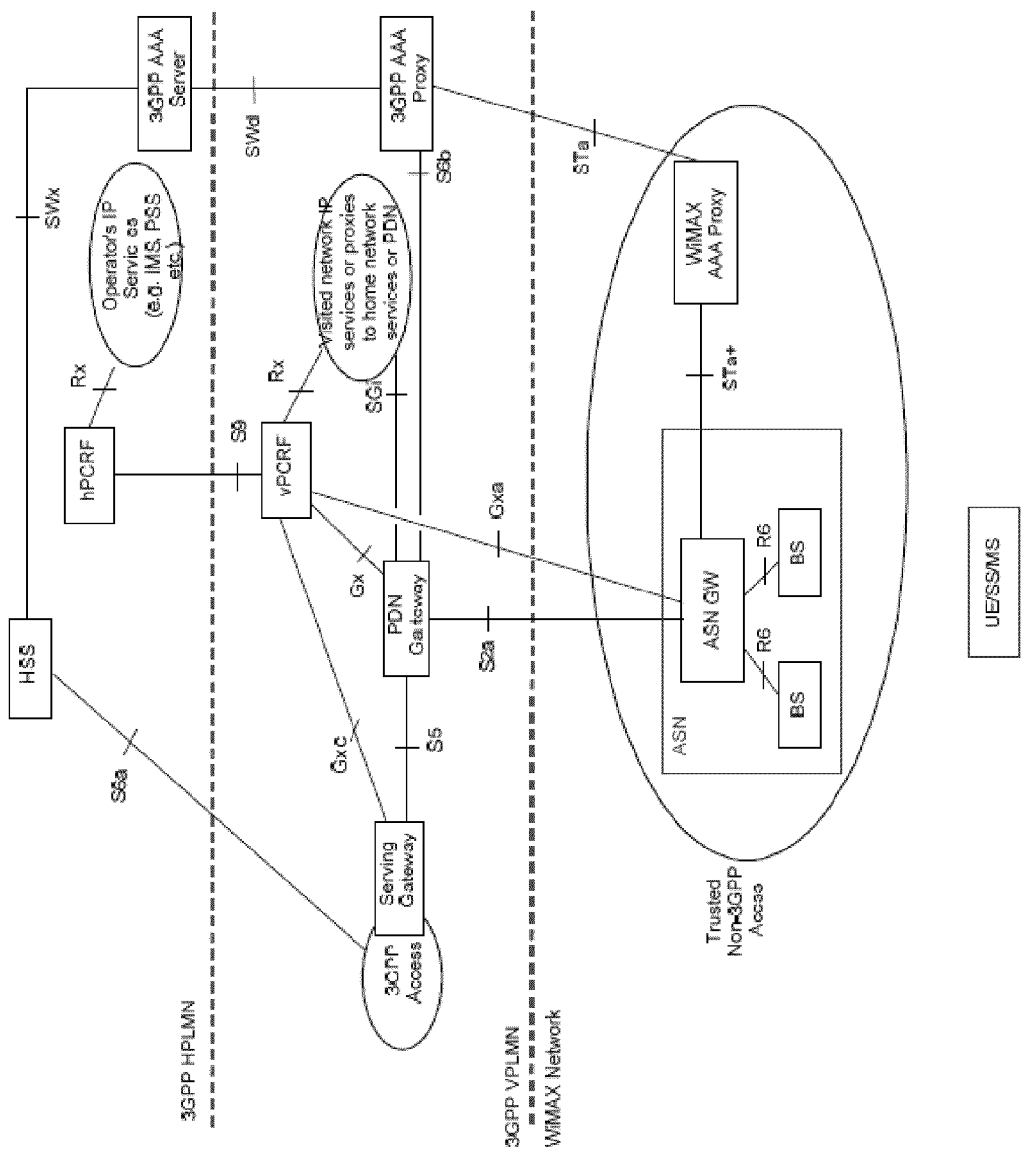

FIG. 2, which includes FIGS. 2a-2c, illustrates non-roaming and roaming architectures within EPS as defined by 3GPP.

FIG. 2a is a non-roaming architecture within EPS using S5, S2a, and S2b reference points (which are described below). FIG. 2b illustrates a roaming architecture for EPS using S8 and S2a in case of home routed. FIG. 2c illustrates a roaming architecture for EPS using S5, and S2a in case of local breakout.

As an example, the trusted non-3GPP IP access comprises a WiMax network having base stations (BS) connected to ASN GW through R6. STa+ reference point is defined between the Authenticator function in the WiMAX ASN and the WiMAX AAA Proxy function. It is used to carry WiMAX specific attributes in addition to 3GPP AAA attributes defined in STa.

The interconnections (reference points) between the various components in EPS are commonly defined and discussed briefly below. As shown in FIGS. 2a-2c, S2a provides the user plane with related control and mobility support between trusted non-3GPP IP access (WiMAX access network) and the 3GPP core network (PDN Gateway). It is defined between the Mobile Access Gateway and Packet Data Gateway. In case that the Mobile IPv4 is used as S2a protocol, then the WiMAX side of this reference point is terminated by the MIPv4 Foreign Agent function. S5 provides user plane tunneling and tunnel management between Serving GW and PDN GW. S5 is used for Serving GW relocation due to UE mobility and in case the Serving GW needs to connect to a non-collocated PDN GW for the required PDN connectivity. S6a is defined between MME and HSS for authentication and authorization. S6b is the reference point between PDN Gateway and 3GPP AAA Server/Proxy for mobility related authentication if needed. S6b may also be used to retrieve and request storage of mobility parameters. This reference point may also be used to retrieve static QoS profile for a UE for non-3GPP access in case dynamic PCC is not supported. Gx provides transfer of (QoS) policy and charging rules from PCRF to Policy and Charging Enforcement Function (PCEF) in the PDN GW. Gxa provides transfer of (QoS) policy information from PCRF to the trusted non-3GPP accesses (ASN GW). Gxc provides transfer of (QoS) policy information from PCRF to the Serving Gateway.

PMIP-based S8 is the roaming interface in case of roaming with home routed traffic. It provides the user plane with related control between Gateways in the VPLMN and HPLMN. S9 provides transfer of (QoS) policy and charging control information between the Home PCRF and the Visited PCRF in order to support local breakout function. In all other roaming scenarios, S9 has functionality to provide dynamic QoS control policies from the HPLMN. SGi is the reference point between the PDN Gateway and the packet data network. Packet data network may be an operator external public or private packet data network or an intra operator packet data network, e.g., for provision of IMS services. This reference point corresponds to Gi and Wi functionalities and supports any 3GPP and non-3GPP access systems.

STa reference point is defined between the WiMAX AAA Proxy and the 3GPP AAA/HSS function in the 3GPP Evolved Packet Core. It is used to carry the access authentication, authorization, QoS, accounting and mobility information related to a specific subscriber. SWd connects the 3GPP AAA Proxy, possibly via intermediate networks, to the 3GPP AAA Server. SWx is located between 3GPP AAA Server and HSS and is used for transport of authentication, subscription and PDN connection related data.

Further detail on the above architectures is provided in 3GPP TS 23.402 version 8.6.0 Release 8, "Universal Mobile Telecommunications System (UMTS); LTE; Architecture enhancements for non-3GPP accesses," RTS/TSGS-0223402v860, (June 2009), which is incorporated herein by reference.

Figure 3:
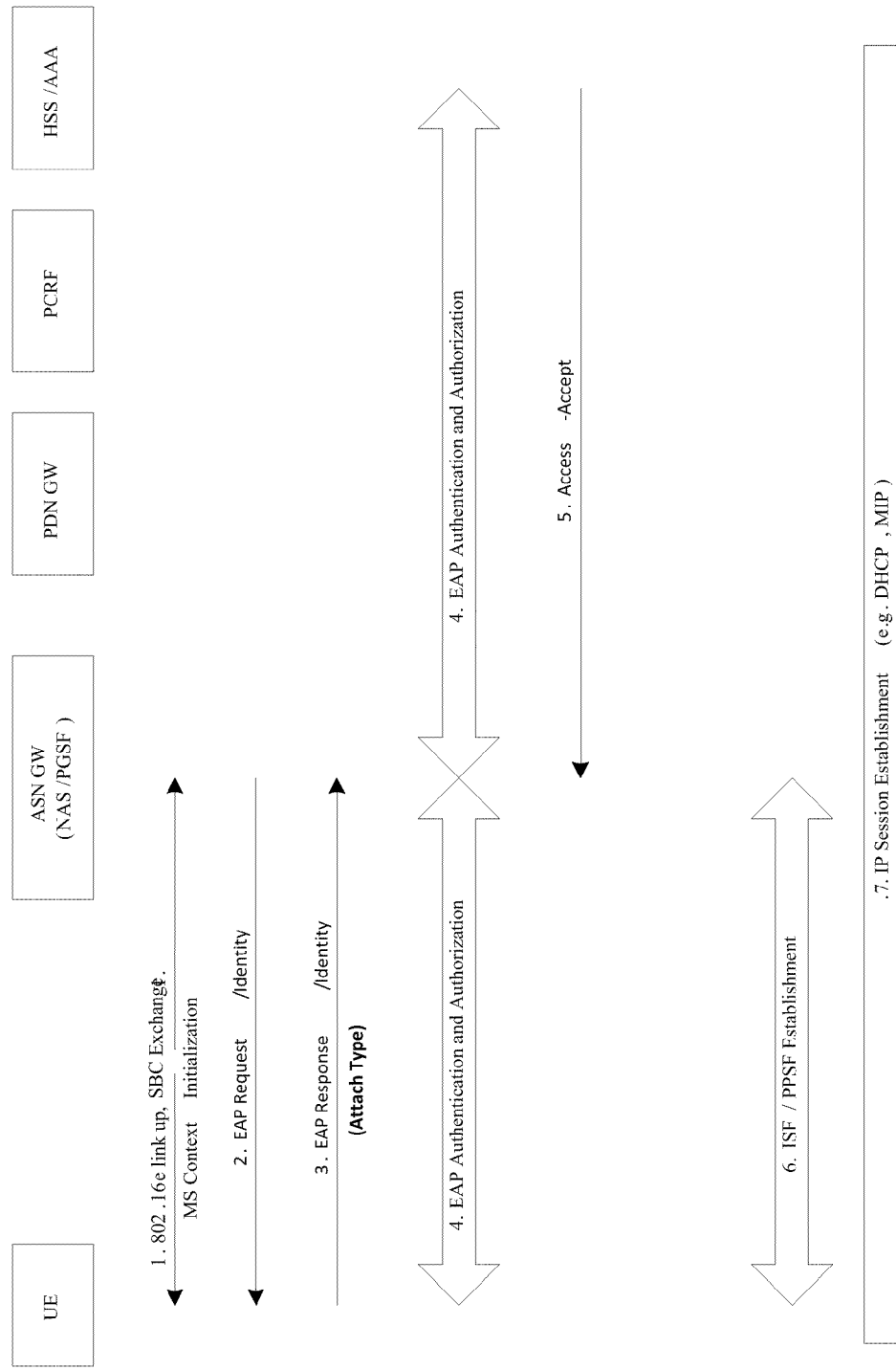
FIG. 3 illustrates a call flow of an embodiment of the invention that enables interworking between 3GPP and WiMax networks by providing an attach type indicator during EAP authorization.

An embodiment of the invention that enables interworking between 3GPP and WiMax networks is described using FIG. 3. The network entry procedure described in FIG. 3 applies amongst others to architectures illustrated in FIG. 2.

A UE may access a WiMax network and request a handover (from a different network) or may request a new packet data network (PDN) connection. Typically, a handover from a first network (e.g., 3GPP network) to another network (e.g., WiMax) may be needed when a MS/UE moves to a different geographical location served by a different network. Alternatively, the MS/UE may request a new network connection. In conventional systems, the WiMax network is unaware of this difference and treats both these scenarios in a similar manner. However, a UE moving over from a different network such as a 3GPP network already has a PDN connection. Terminating this PDN connection and reinitiating a new PDN connection is inefficient and results in service loss to the UE. In various embodiments, the present invention overcomes these deficiencies by providing the information regarding the prior association of the UE to the WiMax network upon network entry.

A UE intending to connect to a network must complete a network entry process. An access point in the range of the UE periodically broadcasts network information. The UE will obtain timing information and transmission parameters from this network advertisement. The UE and the access point establish a sponsor channel to exchange network entry information. The UE is authenticated and registered with the network. After registration, the UE will obtain an internet protocol (IP) address through dynamic host configuration protocol (DHCP) and time of the day information through the time protocol. Finally, service configuration parameters are transferred.

Referring to step 1 of FIG. 3, the UE establishes an initial sponsor channel with the target network (ASN GW), e.g., using 802.16 linkup. The UE and the target network negotiate basic capabilities (SBC exchange) and may be followed by context initialization. In the SBC exchange process, both the UE and the target network exchange basic transmission capabilities and agree on transmission parameters that are supported by both.

With respect to steps 2-5 of FIG. 3, for WiMAX and other wireless broadband access solutions, e.g., WLAN (Wireless Local Area Network), the Extensible Authentication Protocol (EAP) and the so-called EAP method are used as authentication/authorization protocols. The EAP method is based on security credentials and subscription information shared between the subscribers. The subscription information is usually stored in the end device, in the AAA Server or in the central user database. For some users, this subscription information may be stored in an AAA Server of a different network type (such as a 3GPP network).

In accordance with an embodiment of the invention, an ASN GW sends an EAP Request/Identity to the user end (step 2). The authenticator (ASN GW) sends a request to authenticate the user end (UE). The request may have a type field to indicate what is being requested. Typically, the authenticator will send an initial identity request; however, an initial identity request is not required, and may be bypassed. For example, the identity may not be required where it is determined by the port to which the peer has connected, or where the identity is obtained in another fashion.

Referring to step 3, the peer (UE) sends a response packet in reply to a valid request. As with the request packet, the response packet contains a type field, which corresponds to the type field of the request. The authenticator (ASN GW) sends an additional request packet, and the peer replies with a response.

In various embodiments, the present invention defines a new attribute "Attach Type" to indicate if the attach type is an initial attachment request or a handover type from a different network. In accordance with embodiments of the invention, in the EAP Response/Identity message, the conventional network access identifier (NAI) format is modified using WiMax decoration to indicate the "attach type."

The Network Access Identifier (NAI) is the EAP Response/Identity message submitted by the UE during EAP authentication in response to the EAP Request message. In roaming, the purpose of the NAI is to identify the user as well as to assist in the routing of the authentication request. NAI may not necessarily be the same as the user's e-mail address or the user identity submitted in an application layer authentication. This identifier is transmitted during the network access and is used as a part of EAP signaling.

In WiMAX networks, a specific NAI format is used which makes it possible to transfer the WiMAX network specific information from the WiMAX device to the WiMAX network. The specific NAI format is: [RoutingRealm1! RoutingRealm2! . . . !] {WiMAX-decoration} username@realm. In accordance with an embodiment of the invention, the WiMAX decoration is used to transfer information relating to the Attach type to the WiMax network. Hence, the modified NAI format comprises [RoutingRealm1! RoutingRealm2! . . . !] {Attach Type=x} username@realm, wherein x is the Attach Type. Advantageously, using a modified NAI format in the EAP identity response message is independent of the WiMax access technology and hence compatible with 3GPP requirements.

The WiMax network uses the attach type to decide if a new PDN connection must be initiated or already has been assigned to a PDN gateway (PDN GW) due to a previous attach in a 3GPP network. If it is a handover from an existing 3GPP network, the home subscriber server (HSS) provides the PDN GW identity for each of the already allocated PDN GW with the corresponding PDN information to the 3GPP AAA Server which can be retrieved by the WiMax network.

Referring again to step 3, the sequence of requests and responses continues as long as needed. EAP process is a "lock step" protocol, so that other than the initial request, a new request cannot be sent prior to receiving a valid response. The authenticator is responsible for retransmitting requests. After a suitable number of retransmissions, the authenticator should end the EAP conversation. The authenticator must not send a Success or Failure packet when retransmitting or when it fails to get a response from the peer.

The conversation continues until the authenticator cannot authenticate the peer (unacceptable responses to one or more requests), in which case the authenticator implementation must transmit an EAP Failure. Alternatively, the authentication conversation can continue until the authenticator determines that successful authentication has occurred, in which case the authenticator must transmit an EAP Success.

The EAP protocol can support multiple authentication mechanisms without having to pre-negotiate a particular one. Network Access Server (NAS) devices (e.g., ASN GW) do not have to understand each authentication method and may act as a pass-through agent for the backend authentication (e.g., AAA) server as indicated by step 5. An authenticator may authenticate local peers, while at the same time acting as a pass-through for non-local peers and authentication methods it does not implement locally.

Referring to step 6, after the EAP authentification, a Pre-Provisioned Service Flow (PPSF) is established. Pre-provision service flows are established by the ASN as part of network entry operation. After MS is successfully authenticated/authorized and registered by the network, the authenticator in the ASN GW initiates the procedure for pre-provisioned service flow establishment. The pre-provisioned service flows are service flows that must be activated by the network after successful MS access authentication. A service flow is defined by IEEE standard (e.g., IEEE 802.16) as a unidirectional flow of media access control (MAC) service data units on a connection that is provided a particular quality of service (QoS). Among the set of pre-provisioned unicast service flows, the very first pair of service flows (i.e., for uplink and downlink) that are initiated by the ASN-GW are called the Initial Service Flows (ISF). ISF is a special kind of a Pre-Provisioned Service Flow (PPSF) which is used by the MS and the ASN to transfer delay tolerant control traffic such as standards-based IP configuration management and IP client application signaling (e.g., DHCP DISCOVERY, FA Advertisement, Mobile IP Registration, Router Advertisement, SIP signaling, etc.) in case of IP as well as configuration management signaling required for Ethernet in case of Ethernet.

Referring to step 7, after the completion of ISF set up, mobile IP (MIP) connection set up is performed. In WiMAX NWG, PMIP and CMIP are both defined and can be optionally supported. With the PMIP solution, the PMIP client resides within the ASN GW and performs MIP mobility management on behalf of MS. During MIP connection set up, the MS obtains the PoA assignment and IP configuration from network using DHCP messaging carried over the ISF. The DHCP relay or proxy function is supported by the ASN-GW to manage DHCP exchange between the MS and DHCP server. At the completion of MS, PoA assignment and IP configuration, the DHCP relay/proxy function in the ASN GW initiates the PMIP client to start MIP registration with the FA and HA. The MIP registration exchange is performed between the PMIP client, FA and HA.

After completion of MIP registration, the PMIP client triggers the DHCP relay/proxy function to send a DHCP ACK to the MS. With the CMIP solution, the MIP client resides within the MS or host behind the MS. The MIP registration message exchange is performed by the MS, FA and HA relaying through the ASN.

Frequently, a UE may be a subscriber to a 3GPP network and may be roaming under the WiMax. For example, this may require Authentication, Authorization and Accounting (AAA) from the 3GPP network. 3GPP specifies requirements for interworking between WiMax and 3GPP. In order to access the 3GPP Evolved Packet Core (EPC) from non-3GPP accesses, and get AAA services from the Evolved Packet Core, a NAI based user identification is used.

Non-3GPP access authentication defines the process that is used for access control, i.e., to permit or deny a subscriber to attach to and use the resources of a non-3 GPP IP access which is interworked with the EPC network. Non-3 GPP access authentication signaling is executed between the UE and the 3 GPP AAA Server/HSS. The authentication signaling may pass through AAA proxies.

The following principles apply to 3GPP based access authentication. First, transport of authentication signaling is independent of the non-3GPP IP Access technology. Second, the 3GPP based access authentication signaling is based on IETF protocols, e.g., Extensible Authentication Protocol (EAP).

Different IP mobility management protocols (such as Proxy Mobile IP version 6 (PMIPv6) and/or Mobile IP version 4 (MIPv4) Foreign Agent Care-of-Address (FA CoA) mode) may be supported by the UE and/or WiMax networks. This may require establishment of these protocols based on the UE preference and the available support from the networks. The initial attachment procedure is different based on the mobility protocol to be established.

Figure 4:
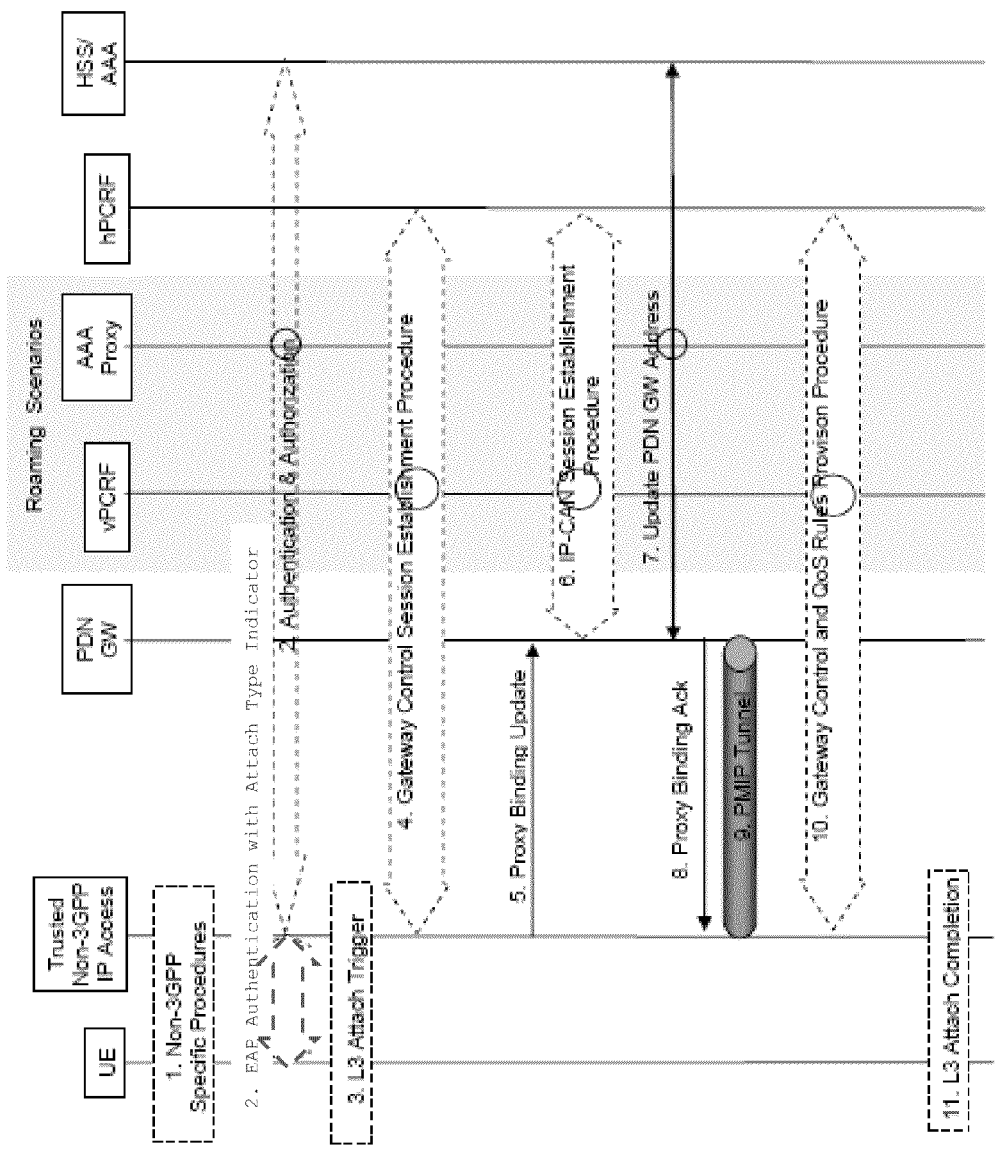
FIG. 4 illustrates a call flow of an embodiment of the invention for PMIPv6 mobility protocol wherein a non-3GPP (WiMax) network is used to connect with the UE.

An embodiment of the invention is described using FIG. 4 for PMIPv6 mobility protocol wherein a non-3GPP (WiMax) network is used to connect with the UE. The network entry procedure described in FIG. 4 applies to both non-roaming and roaming architectures illustrated in FIG. 2.

PMIPv6 specification is used to set up a PMIPv6 tunnel between the trusted non-3GPP IP access and the PDN GW. In both roaming and non-roaming cases, S2a is present, which provides the user plane with related control and mobility support between trusted non 3GPP IP access and the Gateway. It is assumed that Mobile Access Gateway (MAG) exists in the trusted non-3GPP IP access.

Referring to FIG. 4, the initial non-3GPP access specific L2 procedures are performed (step 1). These procedures are non-3GPP access specific and specific for example to WiMax. This includes performing initial WiMAX network entry procedures. As shown in step 2 of FIG. 4, access authentication is subsequently performed. The EAP authentication procedure is initiated and performed involving the UE, trusted non-3GPP IP access and the 3GPP AAA Server.

The PDN Gateway address is determined at this point as shown in step 3. According to 3GPP specifications, the PDN GW is the user plane anchor for mobility between 3GPP access and non-3GPP access.

A PDN Gateway selection function interacts with the 3GPP AAA Server or 3GPP AAA Proxy and uses subscriber information provided by the HSS to the 3GPP AAA Server. To support separate PDN GW addresses at a PDN GW for different mobility protocols (PMIP, MIPv4 or GTP), the PDN GW Selection function takes mobility protocol type into account when deriving PDN GW address by using the Domain Name Service function. During the initial authorization, PDN Gateway selection information for each of the subscribed PDNs is returned to the non-3GPP access system. This enables the entity requiring the IP address of the PDN Gateway to proceed with selection. Once the selection has occurred, the PDN Gateway registers its association with a UE and the APN with the AAA/HSS by sending PDN GW identity that is either its IP address (e.g., if it has a single IP address for all the mobility protocols it supports or if it only supports one mobility protocol) or its FQDN (e.g., if it has multiple IP addresses for the mobility protocols it supports) to the 3GPP AAA Server or AAA Proxy only when the Access Technology Type is non-3GPP.

In the case that a UE already has assigned PDN Gateway(s), the PDN GW identity for each of the already allocated PDN Gateway(s) are returned by the 3GPP AAA Server or Proxy during the authorization step. This eliminates the need to repeat PDN Gateway selection for the PDNs the UE is already connected with. If a UE attaches to a non-3GPP access and it already has assigned PDN Gateway(s) due to a previous attach in a 3GPP access, the HSS provides the PDN GW identity for each of the already allocated PDN Gateway(s) with the corresponding PDN information to the 3GPP AAA Server over the SWx reference point. If a UE attaches to a 3GPP access and it already has an assigned PDN Gateway(s) due to a previous attach in a non-3GPP access, the HSS provides the PDN GW identity for each of the already allocated PDN Gateway(s) with the corresponding PDN information to the MME over the S6a reference point.

If supported by a non-3GPP (WiMax) access network, the attach type is indicated to the non-3GPP access network by the UE. In accordance with embodiments of the invention, in the EAP Response/Identity message, the conventional network access identifier (NAI) format is modified to indicate the "attach type" using WiMax decoration.

The Network Access Identifier (NAI) is the EAP Response/Identity message submitted by the UE during EAP authentication in response to the EAP Request message. This identifier is transmitted during the network access and is used as a part of EAP signaling. The specific NAI format used in WiMax comprises: [RoutingRealm1! RoutingRealm2! . . . !] {WiMAX-decoration} username@realm. In accordance with an embodiment of the invention, the WiMax decoration is used to transfer information relating to the Attach type to the non-3GPP (WiMax) network. Hence, the modified NAI format comprises [RoutingRealm1! RoutingRealm2! . . . !] {Attach Type=x} username@realm, wherein x is the Attach Type.

The attach type indicates "Handover" when the UE already has an activated PDN GW/HA due to mobility from 3GPP access to non-3GPP access. If the PDN subscription profile contains a PDN GW identity and the Attach Type does not indicate "Handover", the non-3GPP access GW may request a new PDN GW, e.g., to allocate a PDN GW that allows for more efficient routing. If the PDN subscription profile contains no PDN GW address for the default PDN and the Attach Type indicates "Handover" the non-3GPP access GW selects a new PDN GW as per the PDN GW selection function of the 3GPP specification discussed above.

Referring next to step 4, the trusted non-3GPP access initiates the Gateway Control Session Establishment Procedure with the PCRF. The trusted non-3GPP access provides the information to the PCRF to correctly associate it with the IP-CAN session to be established in step 6 and also to convey subscription related parameters to the PCRF, including the APN-AMBR (if forwarded by the trusted non-3GPP IP access) and Default Bearer QoS.

Referring next to step 5, the MAG function of trusted non-3GPP IP access sends a Proxy Binding Update (including MN-NAI, Lifetime, Access Technology Type, Handover Indicator, APN, GRE key for downlink traffic, Charging Characteristics, and Additional Parameters) message to the PDN GW. The mobile node network access indentifier (MN-NAI) identifies the UE. Access Technology Type is set to a value matching the characteristics of the non-3GPP access. Handover Indicator is set to "initial" attach if the UE has provided Attach Type indicating "Initial" attach. The Additional Parameters include the Protocol Configuration Options provided by the UE in step 3 and may also include other information. The MAG requests the IP address types (IPv4 address and/or IPv6 Home Network Prefix) based on requested IP address types and subscription profile. If the PDN requires an additional authentication and authorization with an external AAA Server, the PDN GW performs such an additional authentication and authorization at the reception of the Proxy Binding Update.

Referring to step 6, the PDN GW initiates the IP-CAN Session Establishment Procedure with the PCRF. The PDN GW provides information to the PCRF used to identify the session and associate Gateway Control Sessions established in step 4 correctly. The PCRF creates IP-CAN session related information and responds to the PDN GW with PCC rules and event triggers. The PCRF may modify the APN-AMBR and send the APN-AMBR to the PDN GW in the response message.

Referring to step 7, the selected PDN GW informs the 3GPP AAA Server of its PDN GW identity and the APN corresponding to the UE's PDN Connection. This information is registered in the HSS.

As next shown in step 8, the PDN GW processes the proxy binding update and creates a binding cache entry for the UE. The PDN GW allocates IP address(es) for the UE. The PDN GW then sends a Proxy Binding Acknowledgement (MN NAI, Lifetime, UE Address Info, GRE key for uplink traffic, charging ID, Additional Parameters) message to the MAG function in trusted non-3GPP IP access, including the IP address(es) allocated for the UE. The UE Address Info includes one or more IP addresses.

Referring to step 9, a PMIPv6 tunnel is set up between the trusted non-3GPP IP access and the PDN GW. As next shown in step 10, the PCRF may update the QoS rules in the trusted non-3GPP access by initiating a GW Control Session Modification Procedure.

As shown by step 11, L3 attach procedure is completed via a non-3GPP access specific trigger. IP connectivity between the UE and the PDN GW is set for uplink and downlink directions. At this step the IP address information is provided to the UE. For example, WiMax ASN-GW sends a DHCPv4 offer to UE with assigned MN-HoA or RA with assigned IPv6 HNP. UE completes the DHCP procedure configuring the previously offered IP address. IP connectivity between the UE and the PDN-GW for default PDN connection or for the APN provided by UE is set for uplink and downlink directions.

Unless already known from step 3, the non-3GPP IP access should indicate the connected PDN identity (APN) to the UE. If supported by the non-3GPP access, the Protocol Configuration Options provided by the PDN GW in step 8 are returned to the UE in this step using access specific mechanisms.

Figure 5:
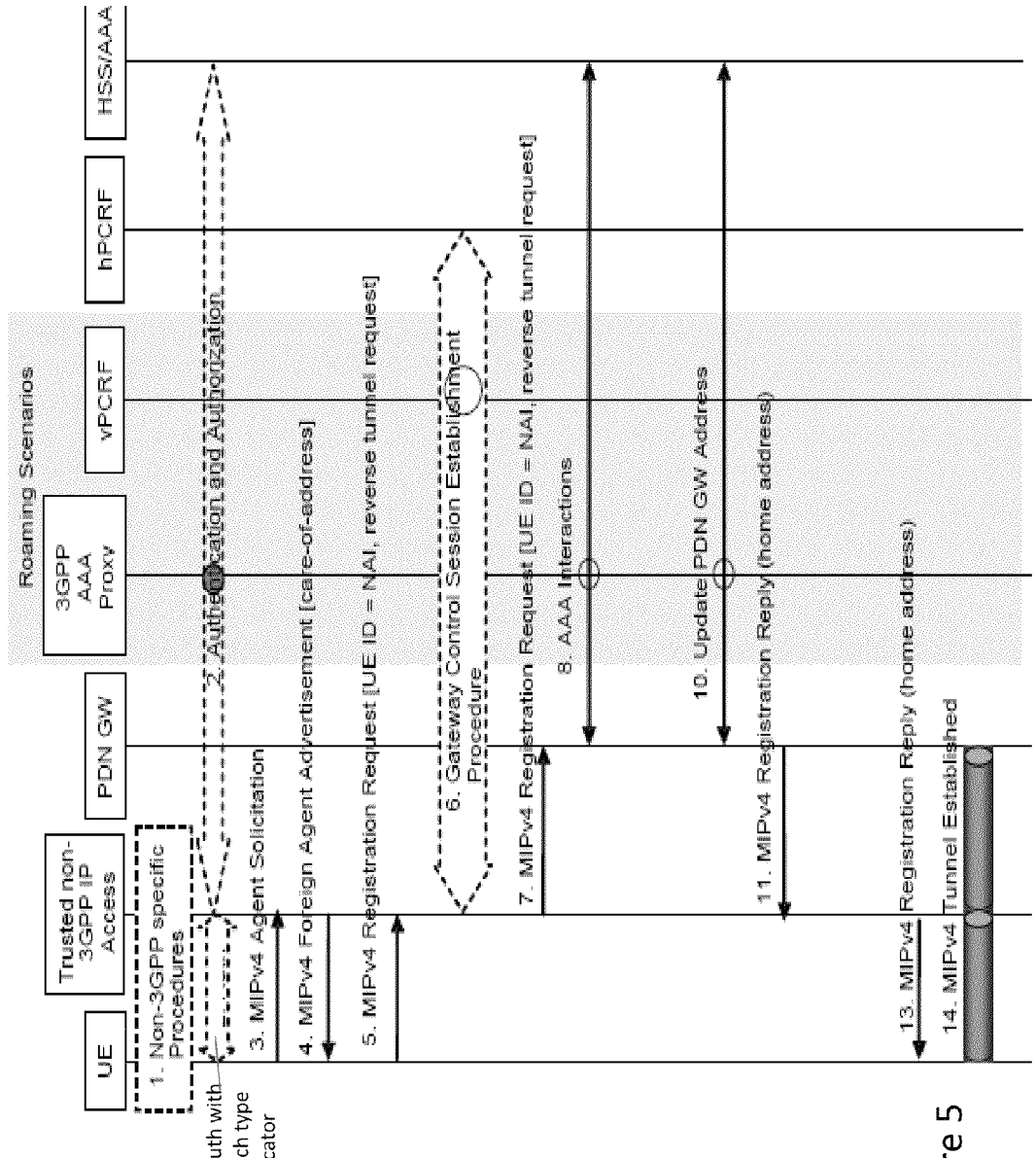
FIG. 5 illustrates a call flow of an embodiment of the invention for MIPv4 FACoA mobility protocol wherein a non-3GPP (WiMax) network is used to connect with the UE.

FIG. 5 illustrates an embodiment of the invention for MIPv4 FACoA mobility protocol wherein a non-3GPP (WiMax) network is used to connect with the UE. In this embodiment, a MIPv4 is used to set up a MIP tunnel between the trusted non-3GPP (WiMax) IP Access and the PDN GW. A Foreign Agent (FA) is located in the trusted non-3GPP IP Access. The network entry procedure described in FIG. 5 applies to both non-roaming and roaming architectures illustrated in FIG. 2.

Referring to step 1, a WiMax event triggers Authentication and Authorization in step 2 between the trusted non-3GPP IP access and the 3GPP AAA Server. The initial WiMax access specific L2 procedures are performed in step 1.

Referring to step 2, the non-3GPP access specific authentication procedure is performed. The authentication procedure between UE and WiMax network is performed as described above with respect to FIG. 3. The PDN Gateway address may be determined at this point as described above; otherwise it is determined in step 5 below. The PDN Gateway information is returned as part of the reply from the 3GPP AAA Server to the FA in the trusted non-3GPP access. This may entail an additional name resolution step.

In accordance with an embodiment of the invention, the Attach Type is indicated to the non-3GPP (WiMax) access network by the UE. In accordance with embodiments of the invention, in the EAP Response/Identity message, using WiMax decoration, the conventional network access identifier (NAI) format is modified to indicate the "attach type."

The Network Access Identifier (NAI) is the EAP Response/Identity message submitted by the UE during EAP authentication in response to the EAP Request message. This identifier is transmitted during the network access and is used as a part of EAP signaling. The specific NAI format used in WiMax comprises: [RoutingRealm1! RoutingRealm2! . . . !] {WiMAX-decoration} username@realm. In accordance with an embodiment of the invention, the WiMax decoration is used to transfer information relating to the Attach type to the non-3GPP (WiMax) network. Hence, the modified NAI format comprises [RoutingRealm1! RoutingRealm2! . . . !] {Attach Type=x} username@realm, wherein x is the Attach Type.

The attach type indicates "Handover" when the UE already has an activated PDN GW/HA due to mobility from 3GPP access to non-3GPP accesses. If the PDN subscription profile contains a PDN GW identity and the Attach Type does not indicate "Handover", the non-3GPP access GW may request a new PDN GW, e.g., to allocate a PDN GW that allows for more efficient routing. If the PDN subscription profile contains no PDN GW address for the default PDN and the Attach Type indicates "Handover", the non-3GPP access GW selects a new PDN GW as per the PDN GW selection function of the 3GPP specification described above.

Referring to step 3, the UE may send an Agent Solicitation (AS) message. As next shown in step 4, the FA in the trusted non-3GPP IP access sends a Foreign Agent Advertisement (FAA) message to the UE. The FAA message includes the Care-of Address (CoA) of the Foreign Agent function in the FA.

Referring to step 5, the UE sends a Registration Request (RRQ) (MN-NAI, lifetime, APN) message to the FA. The MN NAI identifies the UE. Reverse Tunneling shall be requested. This ensures that all traffic will go through the PDN GW. The RRQ message shall include the NAI-Extension. The UE may not indicate a specific Home Agent address in the RRQ message, in which case the PDN Gateway/Home Agent is selected by the FA as per step 2. The UE then receives the IP address of the PDN Gateway in step 13 as part of the Registration Reply (RRP) message. The UE should then include the PDN Gateway address in the Home Agent address field of subsequent RRQ messages. Subscription data is provided to the trusted non-3GPP IP Access by the HSS/AAA in this step. The UE may request connectivity to a specific PDN by using an APN. If the UE provides an APN, the FA verifies that it is allowed by subscription. If the UE does not provide an APN, the FA establishes connectivity with the default PDN. The PDN Gateway selection takes place at this point as described above. This may entail an additional name resolution step.

Referring to step 6, the trusted non-3GPP access initiates the Gateway Control Session Establishment Procedure with the PCRF. The trusted non-3GPP access provides the information to the PCRF to correctly associate it with the IP-CAN session to be established in Step 9 and also to convey subscription related parameters to the PCRF, including the APN-AMBR (if forwarded by the trusted non-3GPP IP access) and Default Bearer QoS.

Referring to step 7, the FA processes the message and forwards a corresponding RRQ (MN-NAI, APN) message to the PDN GW. Referring to step 8, the selected PDN GW obtains Authentication and Authorization information from the 3GPP AAA/HSS.

As shown in step 9, the PDN GW allocates an IP address for the UE. The PDN GW initiates the IP-CAN Session Establishment Procedure with the PCRF. The PDN GW provides information to the PCRF used to identify the session and associate Gateway Control Sessions established in step 6 correctly. The PCRF creates IP-CAN session related information and responds to the PDN GW with PCC rules and event triggers.

As shown in step 10, the selected PDN GW informs the 3GPP AAA Server of the PDN GW identity and the APN corresponding to the UE's PDN Connection. This information is registered in the HSS.

As shown in step 11, the PDN GW sends a RRP (MN-NAI, Home Address, Home Agent Address, Lifetime) to the FA. The Home Address includes UE Home IP Address, the Home Agent Address contains the IP address of Home Agent. The Lifetime indicates the duration of the binding.

As shown in step 12, in case the QoS rules have changed, the PCRF updates the QoS rules in the trusted non-3GPP access by initiating the GW Control Session Modification Procedure. As shown in step 13, the FA processes the RRP (MN-NAI, Home Address, Home Agent Address) and sends a corresponding RRP message to the UE.

Referring to step 14, IP connectivity from the UE to the PDN GW is now set up. A MIPv4 tunnel is established between the FA in the trusted non-3GPP IP access and the PDN GW.

In various embodiments, if the UE is supported by a non-3GPP access network, the Attach Type is indicated to the non-3GPP access network by the UE during the initial authorization. The Attach Type indicates "Handover" when the UE has an activated PDN GW/HA due to mobility from 3GPP access to non-3GPP access.

If the PDN subscription profile contains a PDN GW identity and the Attach Type does not indicate "Handover", the non-3GPP access GW may request a new PDN GW. Alternatively, if the PDN subscription profile contains no PDN GW address for the default PDN and the Attach Type indicates "Handover", the non-3GPP access GW selects a new PDN GW as described in PDN GW selection function described above.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for wireless communication comprising:
   requesting network access from an access point of a first network by a user equipment (UE);
   receiving at the UE an Extensible Authentication Protocol (EAP) authentication request from the access point;
   sending an EAP authentication request response from the UE to the access point, wherein the EAP authentication request response comprises an attach type indicator that indicates to a gateway associated with the access point whether the request for network access is an initial attachment or a handover from a second network, wherein a Network Access Identifier (NAI) in the EAP authentication request response comprises the attach type indicator, and wherein the NAI comprises additional information for the attach type indicator; and
   at the UE, receiving data through an active packet data network connection if the attach type indicator indicates a handover from the second network to the first network.

2. The method of claim 1, wherein one of the networks is a WiMax network, and the other of the networks is a 3GPP network.

3. The method of claim 1, wherein the gateway associated with the access point is an access network server gateway.

4. The method of claim 1, further comprising:
   transmitting the EAP authentication request response to an Authentication, Authorization and Accounting (AAA) server; and
   establishing EAP authentication and authorization by accepting the EAP authentication request response from the user end.

5. The method of claim 4, wherein the AAA Server is an AAA Server of the second network.

6. The method of claim 4, further comprising:
   setting up initial service flows after establishing EAP authentication and authorization; and
   establishing a mobile internet protocol connection.

7. The method of claim 6, wherein the mobile internet protocol comprises mobile IPv4.

8. The method of claim 6, wherein the mobile internet protocol comprises proxy mobile IPv6.

9. The method of claim 1, wherein the NAI format comprises:
   [RoutingRealm1! RoutingRealm2! . . . !]{Attach Type=x}username@realm,
   wherein x is the attach type indicator.

10. The method of claim 1, wherein a new Packet Data Network Gateway (PDN GW) is assigned if the attach type indicator indicates an initial attachment.

11. The method of claim 1, wherein a Packet Data Network Gateway (PDN GW) identity of a previous attach is assigned if the attach type indicator indicates a handover from the second network to the first network.

12. The method of claim 1, wherein the additional information comprises WiMax decoration.

13. A wireless device comprising:
   a receiver configured to receive an Extensible Authentication Protocol (EAP) identity request message from a first and a second network, the second network being a different type of network from the first network;
   a processor configured to generate an EAP identity response message, the EAP identity response message comprising an attach type indicator, wherein a Network Access Identifier (NAI) in the EAP identity response message comprises the attach type indicator, and wherein the NAI comprises additional information for the attach type indicator; and
   a transmitter configured to transmit the identity response message to the first network and the second network, wherein the receiver is configured to receive data through an active packet data network connection if the attach type indicator indicates a handover from the second network to the first network.

14. The wireless device of claim 13, wherein one of the networks comprises a WiMax network, and the other of the networks comprises a 3GPP network.

15. The wireless device of claim 13, wherein the NAI format comprises
   [RoutingRealm1! RoutingRealm2! . . . !]{Attach Type=x} username@realm,
   wherein x is the attach type indicator.

16. The wireless device of claim 13, wherein the additional information comprises WiMax decoration.

17. A wireless communication system comprising:
   a first access network, the first access network being connected to a different second access network, the first access network being configured to respond to an access request from a user end and to transmit an Extensible Authentication Protocol (EAP) authorization request message for authorizing a user end of the second access network, wherein the first access network is configured to receive an EAP response message comprising an attach type indicator, wherein a Network Access Identifier (NAI) in the EAP response message comprises the attach type indicator, wherein the NAI comprises additional information for the attach type indicator, wherein the first access network allows the user end to establish a mobile internet protocol connection based on an acceptance of the EAP response message by an authorization and access server of the second access network, wherein the attach type indicator indicates if the access request is a new connection or if the user end is a handover from the second access network, and wherein the first access network is configured to allow the user end to maintain an active packet data network connection established previously within the second access network.

18. The wireless communication system of claim 17, further comprising:
a user end comprising a receiver configured to receive the EAP authorization request message, a processor configured to generate an EAP response message comprising an attach type indicator, and a transmitter configured to transmit the identity response message to the first access network.

19. The wireless communication system of claim 17, wherein the additional information comprises WiMax decoration.

20. A method for a handover during a wireless communication, the method comprising:
receiving data through an active packet data network connection;
requesting network access from an access point of a first network by a user equipment (UE);
at the UE, receiving an Extensible Authentication Protocol (EAP) authentication request from the access point;
sending an EAP authentication request response from the UE to the access point, wherein the EAP authentication request response comprises an attach type indicator that indicates to a gateway associated with the access point whether the request for network access is an initial attachment or a handover from a second network, wherein a Network Access Identifier (NAI) in the EAP authentication request response comprises the attach type indicator, and wherein the NAI comprises additional information for the attach type indicator; and
at the UE, receiving further data through the active packet data network connection if the attach type indicator indicates a handover from the second network to the first network, wherein the handover is between a third generation partnership project (3GPP) network and a non-3GPP network.

21. The method of claim 20, wherein the additional information comprises WiMax decoration.

22. The method of claim 21, wherein the NAI format comprises
[RoutingRealm1! RoutingRealm2! . . . !]{Attach Type=x}username@realm,
wherein x is the attach type indicator.

* * * * *